United States Patent [19]

Pollitzer

[11] 3,903,191

[45] Sept. 2, 1975

[54] DEHYDROGENATION OF NORMAL PARAFFINS TO OBTAIN NORMAL MONO-OLEFINS

[75] Inventor: Ernest L. Pollitzer, Skokie, Ill.

[73] Assignee: Universal Oil Products Company, Des Plaines, Ill.

[22] Filed: May 1, 1970

[21] Appl. No.: 33,929

Related U.S. Application Data

[63] Continuation-in-part of Ser. Nos. 723,886, April 24, 1968, abandoned, and Ser. No. 823,951, May 12, 1969, abandoned.

[52] U.S. Cl. ............................................. 260/683.3
[51] Int. Cl. ................................................. C07c 5/18
[58] Field of Search ................................... 260/683.3

[56] References Cited
UNITED STATES PATENTS
3,535,402   10/1970   Kluksdahl ...................... 260/683.3

*Primary Examiner*—Veronica O'Keefe
*Attorney, Agent, or Firm*—James R. Hoatson, Jr.; Thomas K. McBride

[57] ABSTRACT

Normal paraffins are dehydrogenated to form normal olefins by contacting them at dehydrogenation conditions with a catalytic composite comprising a combination of a platinum group component, a rhenium component and an alkali or alkaline earth component with an alumina carrier material. A specific example of the dehydrogenation method disclosed herein is a dehydrogenation of long-chain normal paraffins with a catalyst comprising a combination of a platinum component, a rhenium component, and an alkali or alkaline earth component with an alumina carrier material in amounts sufficient to result in a catalytic composite containing, on an elemental basis, 0.01 to 1 wt. % platinum, 0.01 to 1 wt. % rhenium, and 0.01 to 5 wt. % of the alkali or alkaline earth metal.

13 Claims, No Drawings

DEHYDROGENATION OF NORMAL PARAFFINS TO OBTAIN NORMAL MONO-OLEFINS

CROSS REFERENCES TO RELATED APPLICATIONS

This application is a continuation-in-part of my application entitled "Hydrocarbon Conversion Process and Catalyst Therefor", Ser. No. 723,886, filed Apr. 24, 1968 and of my application entitled "Dehydrogenation Method and Catalyst Therefor", Ser. No. 823,951 filed May 12, 1969, both now abandoned The subject of the present invention is, broadly, an improved method for dehydrogenating a normal paraffin hydrocarbon to produce a normal olefin hydrocarbon product containing the same number of carbon atoms but fewer hydrogen atoms. More specifically, the present invention encompasses a method of dehydrogenating normal paraffin hydrocarbons containing 4 to 30 carbon atoms per molecule and especially long chain normal paraffins containing 10 to 18 carbon atoms per molecule to the corresponding normal mono-olefin with minimum production of side products.

The conception of the present invention followed from my search for a novel catalytic composite possessing hydrogenation-dehydrogenation and cracking functions and having superior conversion, selectivity, and stability characteristics when employed in hydrocarbon conversion processes that have traditionally utilized dual-function catalytic composites. In my prior application, I disclosed a significant finding with respect to a catalytic composite meeting these requirements. More specifically, I determined that a catalytic composite comprising a combination of a platinum group component and a rhenium component with an alumina support has vastly superior activity, selectivity, and stability characteristics when it is employed in a process which heretofore utilized dual-function catalytic composites such as a dehydrogenation process. After an extensive investigation of the use of this composite in a dehydrogenation reaction, I have now determined that a particularly preferred catalytic composite for dehydrogenation contains not only a platinum group metal and a rhenium metal, but also an alkali or alkaline earth metal.

The dehydrogenation of dehydrogenatable hydrocarbons is an important commercial process because of the great and expanding demand for dehydrogenated hydrocarbons for use in the manufacture of various chemical products such as detergents, plastics, synthetic rubbers, pharmaceutical products, high octane gasoline, perfumes, drying oils ion-exchange resins, and various other products well known to those skilled in the art. One example of this demand is in the manufacture of high octane gasoline by using $C_3$ and $C_4$ mono-olefins to alkylate isobutane. Another example of this demand is in the area of dehydrogenation of normal paraffin hydrocarbons to produce normal mono-olefins having 4 to 30 carbon atoms per molecule. These normal mono-olefins can, in turn, be utilized in the synthesis of vast numbers of other chemical products. For example, derivatives of normal mono-olefins have become of substantial importance to the detergent industry where they are utilized to alkylate an alkylatable aromatic, such as benzene, with resultant transformation of the product aryl-alkane into a wide variety of biodegradable detergents such as the alkylaryl sulfonate type of detergent which is most widely used today for household, industrial, and commercial processes. Still another large class of detergents produced from these normal mono-olefins are the oxyalkylated phenol derivatives in which the alkyl phenol base is prepared by the alkylation of phenol with these normal mono-olefins. Still another type of detergents produced from these normal mono-olefins are the biodegradable alkylsulfates formed by the direct sulfation of the normal mono-olefin. Likewise, the olefin can be subjected to direct sulfonation with sodium bisulfite to make biodegradable alkylsulfonates. As a further example, these mono-olefins can be hydrated to produce alcohols which then in turn, can be used to produce plasticizers and/or synthetic lube oils.

Responsive to this demand for these dehydrogenation products, the art has developed a number of alternative methods to produce them in commercial quantities. One method that is widely utilized involves the selective dehydrogenation of dehydrogenatable hydrocarbon by contacting the hydrocarbon with a suitable catalyst at dehydrogenation conditions. As is the case with most catalytic procedures, the principal measure of effectiveness for this dehydrogenation method involves the ability to perform its intended function with minimum interference of side reactions for extended periods of time. The analytical terms used in the art to measure how well a particular catalyst performs its intended functions in a particular hydrocarbon conversion reaction are activity, selectivity, and stability, and for purposes of discussion here these terms are generally defined for a given reactant as follows: (1) activity is a measure of the catalyst's ability to convert the hydrocarbon reactant into products at a specified severity level where severity level means the conditions used — that is, the temperature, pressure, contact time, and presence of diluents such as $H_2$; (2) selectivity usually refers to the amount of desired product or products obtained relative to the amount of the reactant converted; (3) stability refers to the rate of change with time of the activity and selectivity parameters — obviously, the smaller rate implying the more stable catalyst. More specifically, in a dehydrogenation process, activity commonly refers to the amount of conversion that takes place for a given dehydrogenatable hydrocarbon at a specified severity level and is typically measured on the basis of disappearance of the dehydrogenatable hydrocarbon; selectivity is typically measured by the amount, calculated on a mole % of converted dehydrogenatable hydrocarbon basis, of the desired dehydrogenated hydrocarbon obtained at the particular severity level; and stability is typically equated to the rate of change with time of activity as measured by disappearance of the dehydrogenatable hydrocarbon and of selectivity as measured by the amount of desired hydrocarbon produced. Accordingly, the major problem facing workers in the hydrocarbon dehydrogenation art is the development of a more active and selective catalytic composite that has good stability characteristics.

I have now found a catalytic composite which possesses improved activity, selectivity, and stability when it is employed in a process for the dehydrogenation of dehydrogenatable hydrocarbons. In particular, I have determined that a synergistic combination of a platinum group component and a rhenium component when combined with an alumina support enables the performances of a dehydrogenation process to be substantially improved. Moreover, I have observed particularly good results when this catalyst is combined with an alkali or alkaline earth metal and utilized to produce dehydrogenated hydrocarbons containing the same carbon structure as the reactant hydrocarbon but fewer hydrogen atoms. This last composite is particularly useful in the dehydrogenation of long-chain normal paraffins to produce the corresponding normal mono-olefin with minimization of side reactions such as skeletal isomerization, aromatization, and cracking.

It is, accordingly, one object of the present invention to provide a novel method for the dehydrogenation of normal paraffin hydrocarbons to the corresponding normal mono-olefin utilizing a catalytic composite comprising a platinum group component, a rhenium component, and an alkali or alkaline earth component combined with an alumina carrier material. Another object is to provide an improved method for the dehydrogenation of long-chain normal paraffin hydrocarbons to produce normal mono-olefins which method minimizes undesirable side reactions such as cracking, skeletal isomerization and aromatization.

In brief summary, one embodiment of the present invention involves a method for dehydrogenating a normal paraffin hydrocarbon to form the corresponding normal mono-olefin which comprises contacting the hydrocarbon at dehydrogenation conditions with a catalyst composite containing a platinum group component, a rhenium component, and an alkali or alkaline earth component combined with an alumina carrier material. This catalytic composite preferably contains these components in an amount, calculated on an elemental basis, of about 0.01 to about 1 wt. % platinum group metal, about 0.01 to about 1 wt. % rhenium and about 0.1 to about 5 wt. % of the alkali or alkaine earth metal.

A second embodiment relates to the dehydrogenation method described in the first embodiment wherein the normal paraffin hydrocarbon contains about 4 to about 30 carbon atoms per molecule.

A third embodiment involves the dehydrogenation method described in the first embodiment wherein the normal paraffin hydrocarbon contains about 10 to 18 carbon atoms per molecule.

Another embodiment comprehends the method presented in the first embodiment with the additional limitation that the platinum group component of the composite is platinum or a compound of platinum.

Yet another embodiment is the method disclosed in the first embodiment wherein the alkali or alkaline earth component is a compound of lithium or potassium.

Other objects and embodiments involve specific details about essential and preferred catalytic ingredients, preferred amounts of components in the composite, suitable methods of composite preparation, suitable long-chain normal hydrocarbons, operating conditions for use in the dehydrogenation process, and the like particulars. These are hereinafter given in the following detailed discussion of each of these facets of the present invention.

Regarding the normal paraffin hydrocarbon that is subjected to the method of the present invention, it is, in general, a normal paraffin hydrocarbon having about 4 to about 30 carbon atoms per molecule. For example, normal paraffin hydrocarbons containing about 10 to 18 carbon atoms per molecule are dehydrogenated by the subjects method to produce the corresponding normal mono-olefin which can in turn the alkylated with benzene and sulfonated to make alkylbenzene sulfonates, detergents having superior biodegradability. Likewise, n-alkanes having 10 to 18 carbon atoms can be dehydrogenated to the corresponding normal mono-olefin which, in turn, can be sulfated or sulfonated to make excellent detergents. Similarly, n-alkane having 6 to 10 carbon atoms can be dehydrogenated to form the corresponding mono-olefin which can, in turn, be hydrated to produce valuable alcohols. Preferred feed streams for the manufacture of detergent intermediates contains a mixture of 4 or 5 adjacent normal paraffin homologues such as $C_{10}$ to $C_{13}$, $C_{11}$ to $C_{15}$, and the like mixtures.

An essential feature of the present invention involves the use of a catalytic composite comprising a combination of a platinum group component, a rhenium component and an alkali or alkaline earth component with an alumina carrier material. Considering first the alumina carrier material, it is preferred that the alumina material be a porous adsorptive surface area material having a surface area of about 25 to about 500 or more $m^2/gm$. Suitable alumina materials are the crystalline aluminas known as gamma-, eta-, and theta-alumina, with gamma alumina giving best results. An especially preferred carrier material has an apparent bulk density of about 0.3 to about 0.7 gm/cc and surface area characteristics such that the average pore diameter is about 20 to about 300 Angstroms, the pore volume is about 0 to about 1 ml/gm, and the surface area is about 100 to 500 $m^2/gm$. In general, best results are typically obtained with a gamma-alumina carrier material which is used in the form of spherical particles having a relatively small diameter, which is typically about 1/16 inch, an apparent bulk density of about 0.5 gm/cc, a pore volume of about 0.4 ml/gm and a surface area of about 175 $m^2/gm$.

The alumina carrier material may be prepared in any suitable manner and may be synthetically prepared or natural occurring. Whatever type of alumina is employed it may be activated prior to use by one or more treatments including drying, calcination, steaming, etc., and it may be in a form known as activated alumina, activated alumina of commerce, porous alumina, alumina gel, etc. For example, the alumina support may be prepared by adding a suitable alkaline reagent, such as ammonium hydroxide to a salt of aluminum such as aluminum chloride, aluminum nitrate, etc., in an amount to form an aluminum hydroxide gel which upon drying and calcining is converted to alumina. The alumina may be formed in any desired shape such as spheres, pills, cakes, extrudates, powders, granules, and utilized in any conventional size. For purposes of the present invention a particularly preferred form of alumina is the sphere; and alumina spheres may be continuously manufactured by the well known oil drop method which comprises forming an alumina hydrosol by any of the techniques taught in the art and preferably by reacting aluminum metal with hydrochloric acid, combining the hydrosol with a suitable gelling agent and dropping the resultant mixture into an oil bath maintained at elevated temperatures. The droplets of the mixture remain in the oil bath until they set and form hydrogel spheres. The spheres are then continuously withdrawn from the oil bath and typically subjected to specific aging treatments in oil and an ammoniacal solution to further improve their physical characteristics. The resulting aged and gelled particles are then washed and dried at a relatively low temperature of about 300° F. to about 400° F. and subjected to a calcination procedure in an air atmosphere at a temperature of about 850° F. to about 1300° F. for a period of about 1 to about 20 hours. It is also a good practice to subject the calcined particles to a high temperature steam treatment in order to remove as much as possible of undesired acidic components. This calcination procedure effects conversion of the alumina hydrogel to the corresponding crystalline gamma-alumina. See U.S. Pat. No. 2,620,314 for additional details regarding this oil drop method.

One essential component for the catalytic composite used in the present invention is a platinum group component. Although the process of the present invention is specifically directed to the use of a catalytic composite containing platinum, it is intended to include other platinum group metals such as palladium, rhodium, ruthenium, osmium, and iridium. The platinum group component, such as platinum, may exist within the final catalytic composite as a compound such as an oxide, sulfide, halide, etc., or as an elemental metal, or in combination with one or more of the other ingredients of the composite. Generally, the amount of the platinum group component present in the final catalyst is small compared to the quantities of the other components combined therewith. In fact, the platinum group component generally comprises about 0.01 to about 1% by weight of the final catalytic composite calculated on an elemental basis. Excellent results are obtained when the catalyst contains about 0.1 to about 0.9 wt. % of the platinum group metal. The preferred platinum group component is platinum or a compound of platinum. Good results can also be obtained when it is palladium or a compound of palladium.

The platinum group component may be incorporated in the catalytic composite in any suitable manner such as coprecipitation or cogellation with the alumina carrier material, ion-exchange with the alumina carrier material and/or alumina hydrogel, or impregnation either after or before calcination of the alumina hydrogel, etc. The preferred method of preparing the catalyst involves the utilization of a soluble, decomposable compound of the platinum group metal to impregnate the alumina carrier. For example, the platinum group metal may be added to the carrier by commingling the latter with an aqueous solution of chloroplatinic acid or chloropalladic acid. Other water-soluble compounds of platinum group metals may be employed in impregnation solutions and include ammonium chloroplatinate, platinum chloride, dinitrodiaminoplatinum, palladium chloride, palladium nitrate, palladium sulfate, etc. The utilization of a platinum or palladium chloride compound, such as chloroplatinic or chloropalladic acid, is ordinarily preferred. In addition, it is generally preferred to impregnate the alumina carrier material after it has been calcined in order to minimize the risk of washing away the valuable platinum metal compounds; however, in some cases it may be advantageous to impregnate the carrier when it is in a gelled state. It is a good practice to include in the impregnation solution a relatively strong acid such as nitric acid in order to facilitate the distribution of the metallic components through the carrier material.

Another essential constituent of the catalyst of the present invention is the rhenium component. This component may be present as an elemental metal, as a chemical compound, such as the oxide, sulfide, halide, or in a physical or chemical association with the alumina carrier material and/or the other components of the catalyst. Generally, the rhenium component is utilized in an amount sufficient to result in a final catalytic composite containing about 0.01 to about 1 wt. % rhenium calculated as an elemental metal. The rhenium component may be incorporated in the catalytic composite in any suitable manner and at any stage in the preparation of the catalyst. As a general rule, it is advisable to introduce the rhenium at a later step of the preparation in order that the expensive metal will not be lost due to subsequent processing involving washing and purification treatments. The preferred procedure for incorporating the rhenium component involves the impregnation of the alumina carrier either before, during, or after the other components of the composite are added. The impregnation solution can in some cases be an aqueous solution of a suitable rhenium salt such as ammonium perrhenate, sodium perrhenate, potassium perrhenate and the like salts. In addition, aqueous solution of rhenium halides such as the chloride may be used if desired, provided the halogen is subsequently removed from the composite by a suitable washing or steaming procedure. However, the preferred impregnation solution is an aqueous solution of perrhenic acid. In general, the rhenium component can be impregnated either prior to, simultaneously with, or after the platinum group component is added to the support. However, I have found that best results are achieved when the rhenium component is impregnated simultaneously with the platinum group component. Thus, a preferred impregnation solution contains chloroplatinic acid, perrhenic acid and nitric acid.

In addition, an especially preferred catalytic composite is prepared when the weight ratio, calculated on an elemental basis, of the rhenium component to the platinum group component is selected from the range of about .05:1 to about 2.75:1, with best results obtained at a weight ratio of about 1:1. This is particularly true when the total weight content of the rhenium component plus the platinum group component in the catalytic composite is fixed in the range of about 0.2 to about 1.5 wt. % and more preferably about 0.4 to about 1, calculated on an elemental basis. Accordingly, examples of especially preferred catalytic composites are composites containing: 0.1 wt. % Re + 0.65 wt. % Pt, 0.2 wt. % Re + 0.55 wt. % Pt, 0.375 wt. % Re + 0.375 wt. % Pt, 0.55 wt. % Re + 0.20 wt. % Pt, and 0.65 wt. % Re + 0.10 wt. % Pt.

Another essential feature of the present invention involves use of a catalytic composite containing an alkali or alkaline earth component. More specifically, this component is selected from the group consisting of the compounds of the alkali metals—cesium, rubidium, potassium, sodium, and of the alkaline earth metals — calcium, strontium, barium, and magnesium. This component may exist within the catalytic composite as a relatively stable compound such as the oxide or sulfide, or in combination with one or more of the other components of the composite, or in combination with the alumina carrier material such as in the form of a metal aluminate. Since, as is explained hereinafter, the composite containing the alkali or alkaline earth is always calcined in an air atmosphere before use in the conversion of hydrocarbons, the most likely state this component exists in during use in dehydrogenation is the metallic oxide. Regardless of what precise form in which it exists in the composite, the amount of this component utilized in preferably selected to provide a composite containing about 0.01 to about 5 wt. % of the alkali or alkaline earth metal, and more preferably about 0.05 to about 2.5 wt. %. Best results are ordinarily achieved when this component is a compound of lithium or potassium.

This alkali or alkaline earth component may be combined with the alumina carrier material in any manner known to those skilled in the art such as by impregnation, coprecipitation, physical admixture, ion-exchange, etc. However, the preferred procedure involves impregnation of the alumina carrier material either before, during, or after it is calcined, and either before, during, or after the other components are added to the carrier material. In general, best results are obtained when the alkali component is added after the other metallic components have been added in order to neutralize the acid which is preferably used during the preferred impregnation procedure for incorporating the platinum group and rhenium components. Typically, the impregnation of the carrier material with this alkali or alkaline earth component is performed by contacting same with a solution of a suitable decomposable compound or salt of the desired alkali or alkaline earth metal. Hence, suitable compounds of the alkali and alkaline earth metals include the halides, sulfates, nitrates, acetates, carbonates, phosphates, and the like compounds. For example, excellent results are obtained by impregnating the alumina carrier material after the platinum group component and rhenium component have been combined therewith, with an aqueous solution of lithium nitrate or potassium nitrate. Following the impregnation step, the resulting composite is dried and calcined in an air atmosphere as explained hereinafter.

Regardless of the details of how the components of the catalyst are combined with the alumina carrier material, the resulting composite will be dried at a temperature of from about 200° F. to about 600° F. for a period of from about 2 to 24 hours or more and finally calcined or oxidized at a temperature of from about 600° F. to about 1100° F. in an air atmosphere for a period of about 0.5 to 10 hours, preferably about 1 to about 5 hours in order to substantially convert the metallic components to the oxide form. In the case where more than one impregnation step is utilized to incorporate the metallic components, a good practice is to perform this calcination step after each impregnation step.

When acidic components are present in any of the reagents used to effect incorporation of any one of the components of the subject composite, it is a good practice to subject the resulting composite to a high temperature treatment with steam, either after or before the calcination step described above, in order to remove as much as possible of the undesired acidic component. For example, when the platinum group component is incorporated by impregnating the carrier material with chloroplatinic acid, it is preferred to subject the resulting composite to a high temperature treatment with steam in order to remove as much as possible of the undesired chloride.

It is preferred that the resulting calcined catalytic composite be subjected to a substantially water-free reduction prior to its use in the conversion of hydrocarbons. This step is designed to insure a uniform and finely divided dispersion of the platinum group and rhenium components throughout the alumina carrier material. Preferably, substantially pure and dry hydrogen (i.e. less than 20 vol. ppm. $H_2O$) is used as the reducing agent in this step. The reducing agent is contacted with the calcined composite at a temperature of about 800° F. to about 1200° F. and for a period of time, of about 0.5 to 10 hours or more, effective to substantially reduce both the platinum group and rhenium components to their elemental state. This reduction treatment may be performed in situ as part of a start-up sequence if precautions are taken to predry the plant to a substantially water-free state and if substantially water-free hydrogen is used.

Although it is not essential, the resulting reduced catalytic composite may, in some cases, be beneficially subjected to a presulfiding operation designed to incorporate in the catalytic composite from about 0.05 to about 0.5 wt. % sulfur calculated on an elemental basis. Preferably, this presulfiding treatment takes place in the presence of hydrogen and a suitable sulfur-containing compound such as hydrogen sulfide, lower molecular weight mercaptans, organic sulfides, etc. Typically, this procedure comprises treating the reduced catalyst with a sulfiding gas such as a mixture of $H_2$ and $H_2S$ containing a mole ratio of $H_2$ to $H_2S$ of about 10:1 at conditions sufficient to effect the desired incorporation of sulfur, generally including a temperature ranging from about 50° F. up to about 1100° F. or more. This presulfiding step may be performed in situ or ex situ.

According to the method of the present invention, the normal paraffin hydrocarbon is contacted with a catalytic component of the type described above in a dehydrogenation zone at dehydrogenation conditions. This contacting may be accomplished by using the catalyst in a fixed bed system, a moving bed system, a fluidized bed system, or in a batch type operation; however, in view of the danger of attrition losses of the valuable catalyst and of well known operational advantages, it is preferred to use a fixed bed system. In this system the paraffin-containing feed stream is preheated by any suitable heating means to the desired reaction temperature and then is passed into a dehydrogenation zone containing a fixed bed of the catalyst type previously characterized. It is, of course, understood that the dehydrogenation zone may be one or more separate reactors with suitable heating means therebetween to insure that the desired conversion temperature is maintained at the entrance to each reactor. It is also to be noted that the reactants may be contacted with the catalyst bed in either upward, downward, or radial flow fashion with the latter being preferred. In addition, it is to be noted that the reactants may be in the liquid phase, a mixed liquid-vapor phase, or a vapor phase when they contact the catalyst, with best results obtained in the vapor phase.

Although hydrogen is the preferred diluent for use in the subject dehydrogenation method, in some cases other art-recognized diluent may be advantageously utilized such as steam, methane, carbon dioxide, and the like diluent. Hydrogen is preferred because it serves the dual function of not only lowering the partial pressure of the dehydrogenatable hydrocarbon, but also of suppressing the formation of hydrogen-deficient, carbonaceous deposits on the catalytic composite. Ordinarily, hydrogen is utilized in amounts sufficient to insure a hydrogen to hydrocarbon mole ratio of about 1:1 to about 20:1, with best results obtained in the range of about 1.5:1 to about 10:1. The hydrogen stream charged to the dehydrogenation zone will typically be recycled hydrogen obtained from the effluent stream from this zone after a suitable separation step.

Regarding the conditions utilized in the process of the present invention, these are generally selected from the conditions well known to those skilled in the art for the particular normal paraffin hydrocarbon which is charged to the process. More specifically, suitable conversion temperatures are selected from the range of about 700° to about 1250° F., with a value being selected from the lower portion of this range for the more easily dehydrogenated hydrocarbons such as the long-chain normal paraffins, and from the higher portion of this range for the more difficulty dehydrogenated hydrocarbons such as the shorter chain normal paraffins. For example, for the dehydrogenation of $C_6$ to $C_{30}$ normal paraffins, best results are ordinarily obtained at a temperature of about 800° to about 950° F. The pressure utilized is ordinarily selected at a value which is as low as possible consistent with the maintenace of catalyst stability and is usually about 0.1 to about 10 atmospheres, with best results ordinarily obtained in the range of about 0.5 to about 3 atmospheres. In addition, a liquid hourly space velocity (calculated on the basis of the volume amount as a liquid of the hydrocarbon charged to the dehydrogenation zone per hour divided by the volume of the catalyst bed utilized) is selected from the range of about 1 to about 40 hr.$^{-1}$, with best results for the dehydrogenation of long-chain normal paraffins typically obtained at a relatively high space velocity of about 25 to 35 hr.$^{-1}$.

Regardless of the details concerning the operation of the dehydrogenation step, an effluent stream will be withdrawn therefrom. This effluent will contain unconverted normal paraffin hydrocarbons, hydrogen, and products of the dehydrogenation reaction. This stream is typically cooled and passed to a separating zone wherein a hydrogen-rich vapor phase is allowed to separate from a hydrocarbon-rich liquid phase. In general, it is usually desired to recover the unreacted normal paraffin hydrocarbon from this hydrocarbon-rich liquid phase in order to make the dehydrogenation process economically attractive. This recovery can be accomplished in any suitable manner known to the art such as by passing the hydrocarbon-rich liquid phase through a bed of suitable adsorbent material which has the capability to selectively retain the normal mono-olefin contained therein or by contacting same with a solvent having a high selectivity for the normal mono-olefins or by a suitable fractionation scheme where feasible. Suitable adsorbents having this capability are activated silica gel, activated carbon, activated alumina, various types of specially prepared molecular sieves, and the like adsorbents. In another typical case, the normal mono-olefins can be separated from the normal paraffins by utilizing the inherent capability of the normal mono-olefin to easily enter into several well known chemical reactions such as alkylation, halogenation, sulfonation, hydration, oxidation, oligomerization, and the like reactions. Irrespective of how the normal mono-olefins are separated from the unreacted normal paraffins, a stream containing the unreacted normal paraffin hydrocarbons will typically be recovered from this hydrocarbon separation step and recycled to the dehydrogenation step. Likewise, the hydrogen phase present in the hydrogen separating zone will be withdrawn therefrom, a portion of it vented from the system in order to remove the net hydrogen make, and the remaining portion is typically recycled through suitable compressing means to the dehydrogenation step in order to provide diluent hydrogen therefor.

In a preferred embodiment of the present invention wherein long chain normal paraffin hydrocarbons are dehydrogenated to the corresponding normal mono-olefins, a preferred mode of operation of this hydrocarbon separation step involves an alkylation reaction. In this mode, the hydrocarbon-rich liquid phase withdrawn from the separating zone is combined with a stream containing an alkylatable aromatic, and the resulting mixture passed to an alkylation zone containing a suitable highly acid catalyst such as an anhydrous solution of hydrogen fluoride. In the alkylation zone the mono-olefins react with the alkylatable aromatic while the unconverted normal paraffins remain substantially unchanged. The effluent stream from the alkylation zone can then be easily separated, typically by means of a suitable fractionation system, to allow recovery of the unreacted normal paraffins. The resulting stream of unconverted normal paraffins is then usually recycled to the dehydrogenation step of the present invention.

The following examples are introduced to illustrate further the novelty, mode of operation, utility, and benefits associated with the dehydrogenation method of the present invention. These examples are intended to be illustrative rather than restrictive.

These examples are all performed in a laboratory scale dehydrogenation plant comprising a reactor, a hydrogen separating zone, a heating means, cooling means, pumping means, compressing means and the like equipment. In this plant, the feed stream containing the normal paraffin hydrocarbon is combined with a hydrogen stream, and the resultant mixture heated to the desired conversion temperature which refers herein to the temperature maintained at the inlet to the reactor. The heated mixture is then passed into contact with the catalyst which is maintained as a fixed bed of catalyst particles in the reactor. The pressures reported herein are recorded at the outlet from the reactor. An effluent stream is withdrawn from the reactor, cooled, and passed into the separating zone wherein a hydrogen gas phase separates from a hydrocarbon-rich liquid phase containing normal mono-olefins, unconverted normal paraffin hydrocarbons, and a minor amount of side products of the dehydrogenation reaction. A portion of the hydrogen-rich gas phase is recovered as excess recycle gas with the remaining portion being continuously recycled through suitable compressive means to the heating zone as described above. The hydrocarbon-rich liquid phase from the separating zone is withdrawn therefrom and subjected to analysis to determine conversion and selectivity for the desired normal mono-olefin hydrocarbon as will be indicated in the Examples. Conversion numbers reported herein are all calculated on the basis of disappearance of the normal paraffin hydrocarbon and are expressed in mole %. Similarly, selectivity numbers are reported on the basis of moles of desired normal mono-olefins produced per 100 moles of normal paraffin hydrocarbon converted.

All of the catalysts utilized in these examples are prepared according to the following general method with suitable modifications in stoichiometry to achieve the compositions reported in each example. First, an alumina carrier material comprising 1/16 inch spheres is prepared by: forming an aluminum hydroxyl chloride sol by dissolving substantially pure aluminum pellets in a hydrochloric acid solution, adding hexamethylenetetramine to the sol, gelling the resulting solution by dropping it into an oil bath to form spherical particles of an alumina hydrogel, aging and washing the resulting particles with an ammoniacal solution, and, finally, drying, calcining, and steaming the aged and washed particles to form spherical particles of gamma-alumina containing substantially less than 0.1 wt. % combined chloride. Additional details as to this method of preparing this alumina carrier material are given in the teachings of U.S. Pat. No. 2,620,314. The resulting gamma-alumina particles are then contacted with an impregnation solution containing chloroplatinic acid, perrhenic acid, and nitric acid in amounts sufficient to yield a final catalytic composite containing the desired amounts of platinum and rhenium. the impregnated spheres are then dried at a temperature of about 300° F. for about an hour and thereafter calcined in an air atmosphere at a temperature of about 500° F. to about 1000° F. for about 2 to 10 hours. In general, it is a good practice to thereafter treat the resulting calcined particles with an air stream containing about 10 to about 30% steam at a temperature of about 1000° F. for an additional period of about 5 hours in order to further reduce the residual combined chloride contained in the catalyst. The alkali or alkaline earth component is then added to the oxidized platinum and rhenium-containing catalyst in a separate impregnation step. In this second impregnation step, the oxidized particles are contacted with an aqueous solution of a suitable decomposable salt of the alkali component. For the catalyst utilized in the present examples, the salt is either lithium nitrate or potassium nitrate. The amount of the salt of the alkali metal utilized is chosen to result in a final catalyst of the desired composition. The resulting alkali impregnated particles are then dried and calcined in an air atmosphere in the same manner as is described above following the first impregnation step.

In all of the examples the catalyst is reduced during start-up by contacting with hydrogen at an elevated temperature and thereafter sulfided with a mixture of $H_2$ and $H_2S$ in an amount sufficient to incorporate about 0.1 to about 0.5 wt. % sulfur.

EXAMPLE I

The catalyst contains, on an elemental basis, 0.375 wt. % platinum, 0.375 wt. % rhenium, 0.8 wt. % lithium, and 0.15 wt. % combined chloride. The feed stream is commercial grade normal dodecane. The dehydrogenation reactor is operated at a temperature of 870° F., a pressure of 10 psig., a liquid hourly space velocity of 32 hr.$^{-1}$, and a hydrogen to hydrocarbon mole ratio of 8:1. After a line-out period, a 20 hour test period is performed during which the average conversion of the normal dodecene is 18% with a selectivity for normal dodecene of 94%.

EXAMPLE II

The catalyst is the same as utilized in Example I. The feed stream is normal tetradodecane. The conditions utilized are a temperature of 840° F., a pressure of 20 psig., a liquid hourly space velocity of 32 hr.$^{-1}$, and a hydrogen to hydrocarbon mole ratio of 8:1. After a line-out period, a 20 hour test shows an average conversion of 12% and a selectivity for normal tetradodecene of 93%.

EXAMPLE III

The catalyst contains, on an elemental basis, 0.30 wt. % platinum, 0.30 wt. % rhenium, and 0.6 wt. % lithium, with combined chloride being less than 0.2 wt. %. The feed stream is substantially pure normal butane. The conditions utilized are a temperature of 950° F., a pressure of 15 psig., a liquid hourly space velocity of 4.0 hr.$^{-1}$, and a hydrogen to hydrocarbon mole ratio of 4:1. After a line-out period, a 20 hour test is performed with the average conversion of the normal butane being 30% and the selectivity for normal butane is 94%.

EXAMPLE IV

The reactor was loaded with a catalyst containing, on an elemental basis, 0.375 wt. % platinum, 0.375 wt. % rhenium, 2.4 wt. % potassium, and less than 0.2 wt. % of combined chloride. The feed stream was a mixture of $C_{11}$–$C_{14}$ normal paraffins containing 0.4 wt. % n-$C_{10}$, 27.2 wt. % n-$C_{11}$, 30.7 wt. % n-$C_{12}$, 25.0 wt. % n-$C_{13}$, 13.0 wt. % n-$C_{14}$, 0.5 wt. % n-$C_{15}$, and 3.2 wt. % nonnormal hydrocarbons. The conditions utilized were a pressure of 30 psig., a liquid hourly space velocity of 32 hr.$^{-1}$, a hydrogen to hydrocarbon mole ratio of 8:1, and a temperature of 860 to 885° F. After a line-out period, the plant was operated for a first period of 12 hours at 860° F. with an average conversion of the normal paraffins of 6.4% and a selectivity for the normal mono-olefins of 99.0%. Thereafter, the plant was run for 120 hours at 870° F. to achieve an average conversion of 8.4% with a selectivity of 97.5. The final period was for a duration of 22 hours at 878° F. during which time the average conversion was 8.6 mole % at a selectivity for the corresponding normal mono-olefins of 98%.

EXAMPLE V

The catalyst contained, on an elemental basis, 0.375 wt. % platinum, 0.375 wt. % rhenium, 1.5 wt. % potassium, and less than 0.2 wt. % combined chloride. The feed stream and conditions utilized, other than temperature, are identical to those given in Example IV. The run is divided into four periods: the first being for 12 hours at 860° F., the second being 126 hours at 870° F., the third being for 30 hours at 878° F., and the fourth being for 54 hours at 887° F. The conversions observed in the four periods were, respectively, 7.4 %, 8.4%, 8.5%, and 8.7%. Similarly, the seclectivities observed in the four periods for the corresponding normal mono-olefins were respectively, 98.5%, 96%, 99%, and 98%.

EXAMPLE VI

The catalyst contained, on an elemental basis, 0.375 wt. % platinum, 0.375 wt. % rhenium, 0.75 wt. % potassium, and less than 0.2 wt. % combined chloride. The feed stream and conditions, other than temperature, were the same as given in Example IV. The run was made for two periods; the first being made at a temperature of 860° F. for 12 hours, and the second being run at a temperature of 869° F. for 54 hours. Conversions observed were 7.4 % and 8.1% respectively. Selectivities for corresponding normal mono-olefins were 94.5% and 92.5 %.

EXAMPLE VII

The catalyst contained, on an elemental basis, 0.375 wt. % platinum, 0.375 wt. % rhenium, 0.6 wt. % lithium, and less than 0.2 wt. % combined chloride. The feed stream and the conditions, other than temperature, were identical to those given in Example IV. The run was divided into three periods: the first being run at 860° F. for 12 hours, the second being run at 869° F. for 126 hours, and the third being run at 878° F. for 90 hours. The results of the test were: a total conversion of 8.3 % with a selectivity for normal mono-olefins of 93% for the first period, a conversion of 9.2 mole % with a selectivity of 89% for the second period and a conversion of 9.5 mole % at a selectivity of 93% for the final period.

EXAMPLE VIII

The catalyst contained, on an elemental basis, 0.30 wt. % platinum, 0.30 wt. % rhenium, 0.6 wt. % lithium, and less than 0.2 wt. % combined chloride. The feed stream is a $C_{11}$ through $C_{14}$ mixture of normal paraffins containing 0.1 wt. % n-$C_{10}$ paraffins, 32.3 wt. % n-$C_{10}$, 31.1 n-$C_{12}$, 23.8 n-$C_{13}$, 11.1 n-$C_{14}$, 0.1 n-$C_{15}$, and 1.5 wt. % non-normals. The conditions utilized, other than temperature, were identical to those specified in Example IV. The run consisted of four periods: the first being conducted at a temperature of 860° F. for 12 hours, the second being at a temperature of 869° F. was for 132 hours, the third period being conducted at a temperature of 878° F. for a period of 30 hours, and the final period operating at a temperature of 887° F for 54 hours. The results observed were: a conversion of 7.7% for the first period, 9.2% for the second period, 9.7% for the third period, and 9.9% for the final period. Corresponding selectivities for normal mono-olefins were: 93.5%, 74.5% 84.5% and 90%.

EXAMPLE IX

The catalyst contained, on an elemental basis 0.05 wt. % platinum, 0.05 wt. % rhenium, 0.6 wt % lithium, and less than 0.2 wt. % combined chloride. The conditions and feed stream utilized were the same as in Example VIII. The test consisted of four periods: the first at a temperature of 860° F. for 12 hours, the second at a temperature of 869° F for 132 hours, the third at a temperature of 878° F. for 24 hours, and the final period at a temperature of 887° F. for 54 hours. Total conversions observed were, respectively, 5.3%, 7.6%, 7.4%, and 7.8%. Corresponding selectivities for normal mono-olefins were: 96%, 96%, 97.5%, and 96%.

In sum, these Examples evidence the capability of the present invention to effect dehydrogenation of a normal paraffin to the corresponding normal mono-olefin at high selectivity levels. This last feature of the present invention is particularly important because in the production of normal mono-olefins it is desired to suppress side reactions such as skeletal isomerization, cracking, and aromatization.

It is intended to cover by the following claims all changes and modifications of the above disclosure of the present invention that would be self-evident to those of ordinary skill in the normal paraffin dehydrogenation art.

I claim as my invention:

1. A process for converting a $C_{10}$–$C_{18}$ paraffin to the corresponding olefin which comprises contacting said paraffin at dehydrogenation conditions, including a temperature of from about 700°F. to about 1250°F., and a pressure of from about 0.1 to about 10 atmospheres, with a catalyst comprising about 0.01 to about 1 weight percent platinum, from about 0.01 to about 1 weight percent rhenium, combined halogen in an amount less than 0.2 weight percent and about 0.01 to about 5 weight percent of an alkali or alkaline earth metal associated with a porous solid carrier.

2. A process for the dehydrogenation of a $C_{10}$–$C_{18}$ paraffin to the corresponding olefin which comprises contacting said paraffin at a temperature of from about 700° to 1250°F. and a pressure of from about 0.1 to about 10 atmospheres with a catalyst comprising about 0.01 to about 1 weight percent platinum, about about 0.01 to about 1 weight percent rhenium, combined halogen in an amount less than 0.2 weight percent and about 0.01 to about 5 weight percent of an alkali metal associated with a porous alumina carrier.

3. A method for dehydrogenating a $C_{10}$–$C_{18}$ normal paraffin hydrocarbon to form the corresponding normal mono-olefin which comprises contacting said hydrocarbon at dehydrogenation conditions with a catalytic composite comprising a combination of a platinum group metal component, a rhenium component, combined halogen in an amount less than 0.2 weight percent and an alkali or alkaline earth metal component with an alumina carrier material, said catalytic composite containing, on an elemental basis, about 0.01 to about 1 wt. % of the platinum group metal, about 0.01 to about 1 wt. % rhenium and about 0.01 to about 5 wt. % of the alkali or alkaline earth metal.

4. A method as defined in claim 3 wherein said normal paraffin hydrocarbon is admixed with hydrogen when it contacts said catalytic composite.

5. A method as defined in claim 3 wherein said platinum group component is platinum or a compound of platinum.

6. A method as defined in claim 3 wherein said platinum group component is palladium or a compound of palladium.

7. A method as defined in claim 4 wherein said dehydrogenation conditions include a temperature of about 700° to about 1250° F., a pressure of about 0.1 to about 10 atmospheres, an LHSV of about 1 to about 40 hours$^{-1}$ and a hydrogen to hydrocarbon mole ratio of about 1:1 to about 20:1.

8. A method as defined in claim 3 wherein said alumina carrier material is gamma-alumina.

9. A method as defined in claim 3 wherein said alkali or alkaline earth component is a compound of lithium.

10. A method as defined in claim 3 wherein said alkali or alkaline earth component is a compound of potassium.

11. The process of claim 1 wherein said porous solid carrier is an inorganic oxide.

12. The process of claim 1 wherein said dehydrogenation process is conducted in the presence of hydrogen in a hydrogen to paraffin mole ratio of about 1:1 to about 20:1.

13. The process of claim 2 wherein said alkali metal is lithium.

* * * * *